United States Patent
Wang (10) Patent No.: US 9,331,945 B2
(45) Date of Patent: May 3, 2016

(54) METHOD AND NETWORK DEVICE FOR TRANSMITTING DATA STREAM

(71) Applicant: Huawei Technologies Co., Ltd., Shenzhen, Guangdong (CN)

(72) Inventor: Kai Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 14/078,107

(22) Filed: Nov. 12, 2013

(65) Prior Publication Data

US 2014/0071828 A1 Mar. 13, 2014

Related U.S. Application Data

(63) Continuation of application No. PCT/CN2011/074089, filed on May 16, 2011.

(51) Int. Cl.
*H04L 12/803* (2013.01)
*H04L 12/18* (2006.01)
*H04L 12/707* (2013.01)
*H04L 12/801* (2013.01)
*H04W 28/02* (2009.01)

(52) U.S. Cl.
CPC .......... *H04L 47/122* (2013.01); *H04L 12/1881* (2013.01); *H04L 45/22* (2013.01); *H04L 47/10* (2013.01); *H04W 28/0289* (2013.01)

(58) Field of Classification Search
CPC .................................................. H04L 12/1881
USPC .................. 370/229, 232, 235, 237, 395, 412
See application file for complete search history.

(56) References Cited

U.S. PATENT DOCUMENTS

| | | | | | |
|---|---|---|---|---|---|
| 5,566,171 | A | * | 10/1996 | Levinson | H04L 12/52 370/249 |
| 6,167,445 | A | * | 12/2000 | Gai | H04L 41/0893 709/220 |
| 6,205,149 | B1 | * | 3/2001 | Lemaire | H04L 12/40032 370/400 |
| 6,259,699 | B1 | * | 7/2001 | Opalka | H04L 12/5601 370/389 |
| 6,934,250 | B1 | * | 8/2005 | Kejriwal | H04Q 3/0091 370/229 |

(Continued)

FOREIGN PATENT DOCUMENTS

| | | |
|---|---|---|
| CN | 101001165 A | 7/2007 |
| CN | 101447919 A | 6/2009 |

(Continued)

*Primary Examiner* — Raj Jain
*Assistant Examiner* — Andrew C Lee
(74) *Attorney, Agent, or Firm* — Leydig, Voit & Mayer, Ltd.

(57) ABSTRACT

A method and a network device for transmitting a data stream are provided in the embodiments of the present disclosure. The present disclosure relates to the field of communications, can ensure the effective transmission of the data stream, and enhances the quality of service of the network. The method for transmitting a data stream includes: determining, according to a forwarding table, candidate forwarding ports for transmitting the data stream; determining, according to a priority level of the data stream and priority levels of the candidate forwarding ports, forwarding ports for transmitting the data stream; transmitting the data stream through a first forwarding port of the forwarding ports; when the first forwarding port is congested, transmitting the data stream through a second forwarding port of the forwarding ports. The embodiments of the present disclosure can be adopted to transmit the data stream.

9 Claims, 3 Drawing Sheets

(56) References Cited

U.S. PATENT DOCUMENTS

| | | | |
|---|---|---|---|
| 6,963,578 B2 * | 11/2005 | Akahane | H04L 45/00 370/219 |
| 6,975,638 B1 * | 12/2005 | Chen | H04L 12/5693 370/232 |
| 6,996,062 B1 * | 2/2006 | Freed | H04L 45/30 370/235 |
| 7,215,637 B1 * | 5/2007 | Ferguson | H04L 45/00 370/230.1 |
| 7,688,727 B1 * | 3/2010 | Ferguson et al. | 370/230.1 |
| 7,699,727 B2 * | 4/2010 | Guenther | A63B 41/08 473/604 |
| 8,077,606 B1 * | 12/2011 | Litwack | H04L 43/0882 370/229 |
| 2001/0007560 A1 * | 7/2001 | Masuda | H04Q 11/0478 370/401 |
| 2002/0141403 A1 * | 10/2002 | Akahane | H04L 45/00 370/389 |
| 2002/0176359 A1 * | 11/2002 | Durinovic-Johri | H04L 12/24 370/229 |
| 2002/0176363 A1 * | 11/2002 | Durinovic-Johri | H04L 45/00 370/237 |
| 2003/0081624 A1 * | 5/2003 | Aggarwal | H04L 12/5601 370/412 |
| 2004/0076161 A1 * | 4/2004 | Lavian | H04L 47/10 370/395.41 |
| 2004/0170181 A1 | 9/2004 | Bogdon et al. | |
| 2005/0213504 A1 * | 9/2005 | Enomoto | H04L 41/142 370/235 |
| 2007/0195773 A1 * | 8/2007 | Tatar | H04L 49/1546 370/392 |
| 2007/0195778 A1 * | 8/2007 | Tatar | H04L 49/1546 370/392 |
| 2008/0062960 A1 | 3/2008 | Chen et al. | |
| 2008/0112312 A1 | 5/2008 | Hermsmeyer et al. | |
| 2009/0141703 A1 | 6/2009 | Ghodrat et al. | |
| 2009/0252161 A1 | 10/2009 | Morris | |
| 2012/0287789 A1 | 11/2012 | Aybay et al. | |
| 2013/0107872 A1 * | 5/2013 | Lovett | H04L 49/10 370/352 |

FOREIGN PATENT DOCUMENTS

| | | |
|---|---|---|
| CN | 101729402 A | 6/2010 |
| CN | 101800702 A | 8/2010 |
| CN | 101997750 A | 3/2011 |
| CN | 102025585 A | 4/2011 |
| CN | 102025621 A | 4/2011 |
| WO | WO 2005064983 A1 | 7/2005 |

* cited by examiner

METHOD AND NETWORK DEVICE FOR TRANSMITTING DATA STREAM

CROSS-REFERENCE TO RELATED APPLICATIONS

This application is a continuation of International Patent Application No. PCT/CN2011/074089, filed on May 16, 2011, which is hereby incorporated by reference in its entirety.

TECHNICAL FIELD

The present disclosure relates to the field of communications, and in particular, to a method and a network device for transmitting a data stream.

BACKGROUND

Conventional IP (Internet Protocol, internet protocol) network mainly bears data service in a best-effort delivery mode, where quality of service seems unimportant. However, with the rapid development of the internet with IP technology as a core, as well as the emergence of a variety of new services such as VOIP (Voice over Internet Protocol, voice over internet protocol), VPN (Virtual Private Network, virtual private network), etc., the IP network has turned from a simple data network into a bearer network with commercial value,. Therefore, it is necessary for the IP network to provide each type of services, which the IP network bears, with corresponding quality of service.

However, in the prior art, the transmission path of a data stream is fixed. Once the current port is congested, data streams can only be discarded according to the priority level of the data streams, which affects the quality of service of the network greatly.

SUMMARY

Embodiments of the present disclosure provide a method and a network device for transmitting a data stream, which can ensure effective transmission of the data stream and enhance quality of service of the network.

To achieve the above object, the embodiments of the present disclosure adopt following technical solutions:

On one aspect, a provided method for transmitting a data stream, which including:

determining, according to a priority level of the data stream and priority levels of ports, available ports for transmitting the data stream;

transmitting the data stream through a first available port of the available ports; and transmitting the data stream through a second available port of the available ports when the first available port is congested.

On another aspect, a provided network device is provided, including:

a forwarding port determining unit, configured to determine forwarding ports according to a destination site of a data stream;

an available port determining unit, configured to select available ports from the forwarding ports, where priority levels of the available ports are less than or equal to a priority level of the data stream; and a forwarding unit, configured to forward the data stream through a first available port of the available ports, and transmit the data stream through a second available port of the available ports when the first available port is congested.

On another aspect, a provided network device is provided, including:

a port determining unit, configured to determine, according to a destination site of a data stream and a priority level of the data stream, available ports for forwarding the data stream; and a forwarding unit, configured to forward the data stream through a first available port of the available ports, and transmit the data stream through a second available port of the available ports when the first available port is congested.

In the method and the network device for transmitting a data stream provided by embodiments of the present disclosure, available ports for forwarding the data stream are determined according to the priority level of the data stream and the priority levels of ports; the data stream is transmitted through a first available port of the available ports; and when the first available port is congested the data stream is transmitted through a second available port in the available ports. Thus, the practice in the prior art that data streams are discarded according to the priority levels once the current port is congested, is avoided. Instead when the first available port is congested, the data stream can turn to the second available port which is not congested for transmission, thus ensuring the effective transmission of the data stream and then enhancing the quality of service of the network.

BRIEF DESCRIPTION OF DRAWINGS

To illustrate the technical solutions of embodiments of the present disclosure or in the prior art more clearly, the accompanying drawings used for describing the embodiments or the prior art are briefly described hereunder. Apparently, the accompanying drawings in the following descriptions merely show some embodiments of the present disclosure, and persons of ordinary skill in the art can obtain other drawings according to the accompanying drawings without creative efforts.

DESCRIPTION OF EMBODIMENTS

The technical solutions in the embodiments of the present disclosure are described in the following clearly and completely with reference to the accompanying drawings. Obviously, the embodiments described are only a part of embodiments of the present disclosure, rather than all embodiments. All other embodiments obtained by persons of ordinary skill in the art on the basis of the embodiments herein without any creative effort fall within the protection scope of the present disclosure.

Figure 1:
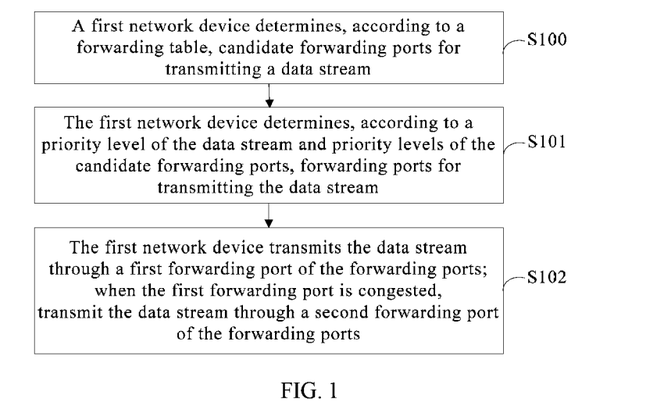
FIG. 1 is a schematic flow chart of a method for transmitting a data stream according to an embodiment of the present disclosure.

A method for transmitting a data stream according to an embodiment of the present disclosure, as shown in FIG. 1, includes:

S100, a first network device determines, according to a forwarding table, candidate forwarding ports for transmitting a data stream.

S101, the first network device determines, according to a priority level of the data stream and priority levels of the candidate forwarding ports, forwarding ports for transmitting the data stream.

S102, the first network device transmits the data stream through a first forwarding port of the forwarding ports; when the first forwarding port is congested, transmit the data stream through a second forwarding port of the forwarding ports; where the priority level of the first forwarding port is higher than the priority level of the second forwarding port.

Optionally, in another embodiment of the present disclosure, the aforementioned first forwarding port may be a port with the highest priority level in the forwarding ports.

Optionally, in another embodiment of the present disclosure, the aforementioned determining, according to the priority level of the data stream and the priority levels of the candidate forwarding ports, forwarding ports for transmitting the data stream may include: when a priority level of a port is lower than or equal to the priority level of the data stream, determining that the port is a forwarding port which can be used for transmitting the data stream. That is, the state of the port is UP for the data stream.

On the other hand, the aforementioned determining, according to the priority level of the data stream and the priority levels of the candidate forwarding ports, forwarding ports for transmitting the data stream may also include: when a priority level of a port is higher than the priority level of the data stream, determining that the port is not a forwarding port which can be used for transmitting the data stream. That is, the state of the port is DOWN for the data stream.

Optionally, in another embodiment of the present disclosure, connectivity of the first data stream on a certain port (for convenience of explanation, referred to as port X for short herein) may be detected through detecting techniques of QOS BFD (Quality Of service Bidirectional Forwarding Detection, quality of service bidirectional forwarding detection) or QOS ETH OAM (Quality Of service Ethernet Operations Administration and Maintenance, quality of service ethernet operations administration and maintenance), etc., where a priority level of the port X is equal to the priority level of the first data stream. When connected state of the first data stream is detected to be abnormal, the state of the port X corresponding to the first data stream is changed to DOWN.

Optionally, the state of the port X corresponding to a second data stream is still UP, where a priority level of the second data stream is higher than the priority level of the first data stream.

An exemplary scenario is introduced here. In this scenario, it's assumed that the priority level of the data stream has 4 levels, and the network device has 5 ports (port A, port B, . . . , port E), and the priority level of the ports of the network device may also be set to 4 levels (ascending from priority level 1 to priority level 4), where the priority level of the port A is 1, the priority level of the port B is 4, the priority level of the port C is 2, the priority level of the port D is 3, and the priority level of the port E is 4.

Therefore, when the network device receives a data stream, where the priority level of the data stream is 3, the network device may look up its forwarding table, such as routing table, MAC address table, or MPLS table, etc., to determine candidate forwarding ports according to the destination address of the data stream. In this scenario, the candidate forwarding ports are: port A, port B, port C, port D and port E.

Then the network device may determine, according to the priority level of the data stream and the priority levels of the candidate forwarding ports, forwarding ports for transmitting the data stream. In this scenario, the forwarding ports are: port A, port C and port D.

After the forwarding ports are determined, the data stream may be transmitted through one of the determined forwarding ports. Preferably, the data stream may be transmitted through the port D, where the priority level of the port D is the highest therein.

When congestion occurs on port D, the data stream may be transmitted through port C, where the priority level of the port C comes second, and so forth. Optionally, when congestion occurs on all of the forwarding ports which can be used for transmitting the data stream, it may be considered whether to discard the data stream according to the priority level of the data stream.

Further, a PST (Port State Table, port state table) may be set for each port priority level. In the PST, the port state may be determined according to the priority level of the port and the priority level of the data stream. Refer to Table 1 to Table 4. After the data stream is received, the PST may be queried, to determine whether a port is a forwarding port which can be used for transmitting the data stream.

TABLE 1

PST of port priority level 1

| Port Priority level | Data Stream Priority level | Port State |
| --- | --- | --- |
| 1 | 1 | UP |
|   | 2 | UP |
|   | 3 | UP |
|   | 4 | UP |
|   | 5 | UP |
|   | 6 | UP |
|   | 7 | UP |
|   | 8 | UP |

TABLE 2

PST of port priority level 2

| Port Priority level | Data Stream Priority level | Port State |
| --- | --- | --- |
| 2 | 1 | DOWN |
|   | 2 | UP |
|   | 3 | UP |
|   | 4 | UP |
|   | 5 | UP |
|   | 6 | UP |
|   | 7 | UP |
|   | 8 | UP |

TABLE 3

PST of port priority level 3

| Port Priority level | Data Stream Priority level | Port State |
| --- | --- | --- |
| 3 | 1 | DOWN |
|   | 2 | DOWN |
|   | 3 | UP |
|   | 4 | UP |
|   | 5 | UP |
|   | 6 | UP |
|   | 7 | UP |
|   | 8 | UP |

TABLE 4

PST of port priority level 4

| Port Priority level | Data Stream Priority level | Port State |
|---|---|---|
| 4 | 1 | DOWN |
|   | 2 | DOWN |
|   | 3 | DOWN |
|   | 4 | UP |
|   | 5 | UP |
|   | 6 | UP |
|   | 7 | UP |
|   | 8 | UP |

The method for transmitting a data stream according to embodiments of the present disclosure determines forwarding ports for transmitting the data stream according to the priority level of the data stream and the priority levels of ports; transmits the data stream through a port with relatively low priority level when the port with relatively high priority level is congested. Thus, the practice in the prior art that the data streams are discarded according to the priority level of the data stream once the current port congested is avoided, thus ensuring the effective transmission of the data stream and then enhancing the quality of service of the network.

Optionally, in another embodiment of the present disclosure, a data stream is transmitted through the aforementioned first forwarding port to a third forwarding port of a second network device; where the priority level of the third forwarding port, is lower than or equal to the priority level of the first forwarding port. Similarly, the data stream may be transmitted through the third port to a fourth forwarding port of a third network device; where the priority level of the fourth forwarding port, is lower than or equal to the priority level of the third forwarding port. And so forth, until the data stream is transmitted to a destination device.

In this scenario, only the aforementioned S100~S102 or the methods provided by optional embodiments need to be performed.

Optionally, each port of each network device may be pre-specified to connect with ports with a lower priority level of another network device, according to the priority level of each port of each network device in the network, to form a forwarding table containing priority level relationships. Optionally, ports of each network device may be specified to connect with ports with a lower priority level of another network device, by extended ISIS (Intermediate System to Intermediate System routing protocol, intermediate system to intermediate system routing protocol), BGP (Border Gateway Protocol, border gateway protocol) or OSPF (Open Shortest Path First, open shortest path first protocol) or other protocols, to form a forwarding table containing priority level relationships.

For example, the port with priority level 8 of the first network device may be pre-specified to be connected with the ports with priority level 1, 2, 3, 4, 5, 6, 7, 8 of the second network device, the port with priority level 7 of the first network device can be pre-specified to be connected with the ports with priority level 1, 2, 3, 4, 5, 6, 7 of the second network device, the port with priority level 6 of the first network device may be pre-specified to be connected with the ports with priority level 1, 2, 3, 4, 5, 6 of the second network device . . . and so forth.

Thus, when the data stream with priority level 6 reaches the ingress of the network (in this example, the first network device), the first network device determines, according to the aforementioned S100~S102 or the methods provided by optional embodiments, that the ports which can be used for transmitting the data stream. Where the ports which can be used for transmitting the data stream, include ports with priority level 1, 2, 3, 4, 5, 6. Since each of the ports with priority level 1, 2, 3, 4, 5, 6 is pre-specified respectively to be connected with the ports with a lower or same priority level of the second network device, when the aforementioned data stream with priority level 6 reaches the second network device, the port for forwarding the data stream may be determined directly according to the destination site of the data stream and the priority level of the data stream.

It can be seen that compared to the data stream with a low priority level, the data stream with a higher priority level may select more ports for transmission, so there are more forwarding paths and then more choices, achieving a more reliable forwarding.

It should be noted that in the embodiments of the present disclosure, serial numbers are only for describing clearly, representing neither merits nor order.

Figure 2:
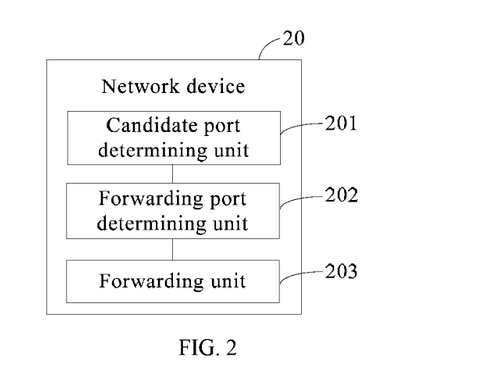
FIG. 2 is a schematic structural diagram of a network device according to an embodiment of the present disclosure.

A network device 20 for transmitting a data stream according to an embodiment of the present disclosure, as shown in FIG. 2, includes:

a candidate port determining unit 201, configured to determine candidate forwarding ports for transmitting a data stream;

a forwarding port determining unit 202, configured to determine, according to a priority level of the data stream and priority levels of the candidate forwarding ports, forwarding ports for transmitting the data stream;

a forwarding unit 203, configured to transmit the data stream through a first forwarding port of the forwarding ports; when the first forwarding port is congested, transmit the data stream through a second forwarding port of the forwarding ports; where a priority level of the first forwarding port is higher than a priority level of the second forwarding port.

The network device according to embodiments of the present disclosure, determines forwarding ports for transmitting the data stream according to the priority level of the data stream and the priority levels of ports; transmits the data stream through a port with relatively low priority level when the port with relatively high priority level is congested. Thus, the practice in the prior art that the data streams is discarded according to the priority level of the data stream once the current port is congested, is avoided, thus ensuring the effective transmission of the data stream and then enhancing the quality of service of the network.

Figure 3:
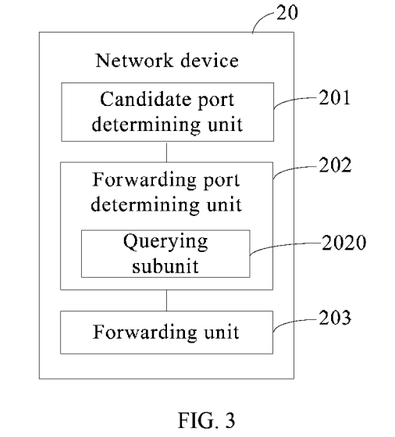
FIG. 3 is another schematic structural diagram of a network device according to an embodiment of the present disclosure.

Optionally, as shown in FIG. 3, the forwarding port determining unit 202 may include:

a querying subunit 2020, configured to query a port state table to obtain a state of a port, where the port state table includes the correspondence of port priority level, data stream priority level and port state.

Figure 4:
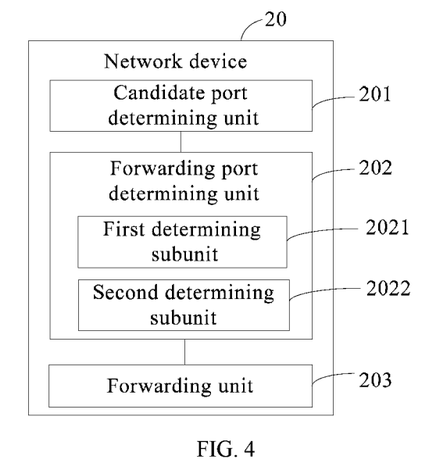
FIG. 4 is another schematic structural diagram of a network device according to an embodiment of the present disclosure.

Optionally, as shown in FIG. 4, the forwarding port determining unit 202 may include:

a first determining subunit 2021, configured to determine that a port is a forwarding port which can be used for transmitting the data stream, when the priority level of the port is lower than or equal to the priority level of the data stream.

a second determining subunit 2022, configured to determine that a port is not a forwarding port which can be used for transmitting the data stream, when the priority level of the port is higher than the priority level of the data stream.

Figure 5:
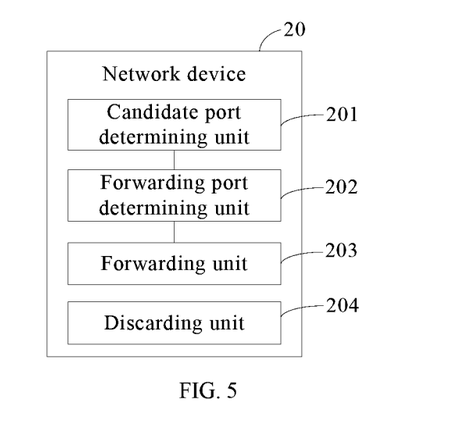
FIG. 5 is another schematic structural diagram of a network device according to an embodiment of the present disclosure.

Optionally, as shown in FIG. 5, the network device may also include:

a discarding unit 204, configured to judge, according to the priority level of the data stream, whether to discard the data stream, when all forwarding ports which can be used for transmitting the data stream are congested. A network system for transmitting a data stream according to an embodiment of the present disclosure includes: a first network device and a second network device, a first forwarding port of the first network device is connected with a third forwarding port of the second network device, a second forwarding port of the first network device is connected with a fourth forwarding port of the second network device; where a priority level of the third forwarding port is lower than or equal to a priority level of the first forwarding port, a priority level of the fourth forwarding port is lower than or equal to a priority level of the second forwarding port; where, The first network device is configured to determine, according to a forwarding table of the first network device, candidate forwarding ports for transmitting the data stream; determine, according to a priority level of the data stream and priority levels of the candidate forwarding ports, forwarding ports for transmitting the data stream; transmit the data stream through the first forwarding port of the forwarding ports; transmit the data stream through the second forwarding port of the forwarding ports when the first forwarding port is congested; where the priority level of the first forwarding port is higher than the priority level of the second forwarding port; The second network device is configured to receive the data stream from the first network device, and determine, according to a forwarding table of the second network device, forwarding ports for transmitting the data stream.

In the network system according to the embodiment of the present disclosure, the first network device can determine, according to the priority level of a data stream and the priority levels of ports, forwarding ports for transmitting the data stream; transmit the data stream through a port with relatively low priority level when the port with relatively high priority level is congested. Thus, the practice in the prior art that the data stream is discarded according to the priority level of the data stream once the current port is congested, is avoided, thus ensuring the effective transmission of the data stream and then enhancing the quality of service of the network. The second network device determines forwarding ports for transmitting the data stream directly according to the forwarding port, improving the forwarding efficiency while ensuring the quality of service of the data stream.

Optionally, the network device in the aforementioned embodiment may be a router or a switch.

Those skilled in the art may understand that all or part of the steps in the methods of the embodiments can be implemented by hardware under the instruction of a program. The program may be stored in a computer readable storage medium and when the program is executed, the steps in the methods of the embodiments are performed. The storage medium may be any medium that can store a program code, including ROM, RAM, a floppy disk, or an optical disk, etc.

The above mentioned are only specific embodiments of the present disclosure, however the protection scope of the present disclosure is not limited to this, all modifications or replacements, which can be easily thought of within the technical disclosure of the present disclosure by any technical person familiar with the art, should fall within the protection scope of the present disclosure. Therefore, the protection scope of the present disclosure is subject to the protection scope of the claims.

What is claimed is:

1. A method for transmitting a data stream, comprising:
    determining, by a first network device, according to a forwarding table, candidate forwarding ports for transmitting the data stream;
    determining, according to a priority level of the data stream and priority levels of the candidate forwarding ports, forwarding ports for transmitting the data stream, wherein the candidate forwarding ports are determined as the forwarding ports which can be used for transmitting the data stream, when the priority levels of the candidate forwarding ports are lower than or equal to the priority level of the data stream; and the candidate forwarding ports are not determined as the forwarding ports which can be used for transmitting the data stream, when the priority levels of the candidate forwarding ports are higher than the priority level of the data stream; and
    transmitting the data stream through a first forwarding port of the forwarding ports; when the first forwarding port is congested, transmitting the data stream through a second forwarding port of the forwarding ports; wherein a priority level of the first forwarding port is higher than a priority level of the second forwarding port.

2. The method according to claim 1, wherein the determining, according to a priority level of the data stream and priority levels of the candidate forwarding ports, forwarding ports for transmitting the data stream, comprises: querying a port state table to determine the forwarding ports for transmitting the data stream; wherein the port state table comprises correspondence of port priority level, data stream priority level, and port state.

3. The method according to claim 1, wherein the determining, according to a forwarding table, candidate forwarding ports for transmitting the data stream, comprises:
    looking up a routing table, or a media access control address table, or a multi protocol label switching table, to determine candidate forwarding ports according to a destination address of the data stream.

4. The method according to claim 1, further comprising:
    discarding the data stream according to the priority level of the data stream, when all of the forwarding ports for transmitting the data stream are congested.

5. The method according to claim 2, wherein the determining, according to a forwarding table, candidate forwarding ports for transmitting the data stream, comprises:
    looking up a routing table, or a media access control address table, or a multi protocol label switching table, to determine candidate forwarding ports according to a destination address of the data stream.

6. The method according to claim 2, further comprising:
    discarding the data stream according to the priority level of the data stream, when all of the forwarding ports for transmitting the data stream are congested.

7. A network device for transmitting a data stream, comprising processor and a non-transitory processor readable storage medium including executable instructions that when executed by the processor, perform a method comprising:
    determining candidate forwarding ports for transmitting the data stream;
    determining, according to a priority level of the data stream and priority levels of the candidate forwarding ports, forwarding ports for transmitting the data stream; and
    transmitting the data stream through a first forwarding port of the forwarding ports; when the first forwarding port is congested, transmitting the data stream through a second forwarding port of the forwarding ports; wherein a priority level of the first forwarding port is higher than a priority level of the second forwarding port;
    wherein the determining according to a priority level of the data stream and priority levels of the candidate forwarding ports, forwarding ports for transmitting the data stream, comprises:
        determining that the candidate forwarding ports are the forwarding ports which can be used for transmitting the data stream when the priority levels of the candidate forwarding ports are lower than or equal to the priority level of the data stream; and determining that the candidate forwarding ports are not the forwarding ports which can be used for transmitting the data stream, when the priority levels of the candidate forwarding ports are higher than the priority level of the data stream.

8. The network device according to claim 7, wherein the determining, according to the priority level of the data stream and the priority levels of the candidate forwarding ports, the forwarding ports for transmitting the data stream, comprises:

querying a port state table, wherein the port state table includes correspondence of port priority level, data stream priority level, and port state.

9. A network system for transmitting a data stream, comprising:

a first network device and a second network device, a first forwarding port of the first network device being connected with a third forwarding port of the second network device, a second forwarding port of the first network device being connected with a fourth forwarding port of the second network device; wherein a priority level of the third forwarding port is lower than or equal to a priority level of the first forwarding port, a priority level of the fourth forwarding port is lower than or equal to a priority level of the second forwarding port; wherein, the first network device is configured to determine, according to a forwarding table of the first network device, candidate forwarding ports for transmitting the data stream; determine, according to a priority level of the data stream and priority levels of the candidate forwarding ports, forwarding ports for transmitting the data stream, wherein the candidate forwarding ports are determined as the forwarding ports which can be used for transmitting the data stream, when the priority levels of the candidate forwarding ports are lower than or equal to the priority level of the data stream; and the candidate forwarding ports are not determined as the forwarding orts which can be used for transmitting the data stream when the priority levels of the candidate forwarding ports are higher than the priority level of the data stream; transmit the data stream through the first forwarding port of the forwarding ports; and when the first forwarding port is congested, transmit the data stream through the second forwarding port of the forwarding ports; wherein the priority level of the first forwarding port is higher than the priority level of the second forwarding port; and the second network device is configured to receive the data stream from the first network device, and determine, according to a forwarding table of the second network device, forwarding ports for transmitting the data stream.

* * * * *

UNITED STATES PATENT AND TRADEMARK OFFICE
CERTIFICATE OF CORRECTION

| | | |
|---|---|---|
| PATENT NO. | : 9,331,945 B2 | Page 1 of 1 |
| APPLICATION NO. | : 14/078107 | |
| DATED | : May 3, 2016 | |
| INVENTOR(S) | : Kai Wang | |

It is certified that error appears in the above-identified patent and that said Letters Patent is hereby corrected as shown below:

In the claims,

Column 8, lines 47-48, "comprising processor" should read -- comprising a processor --.

Column 10, line 13, "orts" should read -- ports --.

Signed and Sealed this
Nineteenth Day of July, 2016

Michelle K. Lee
*Director of the United States Patent and Trademark Office*